UNITED STATES PATENT OFFICE.

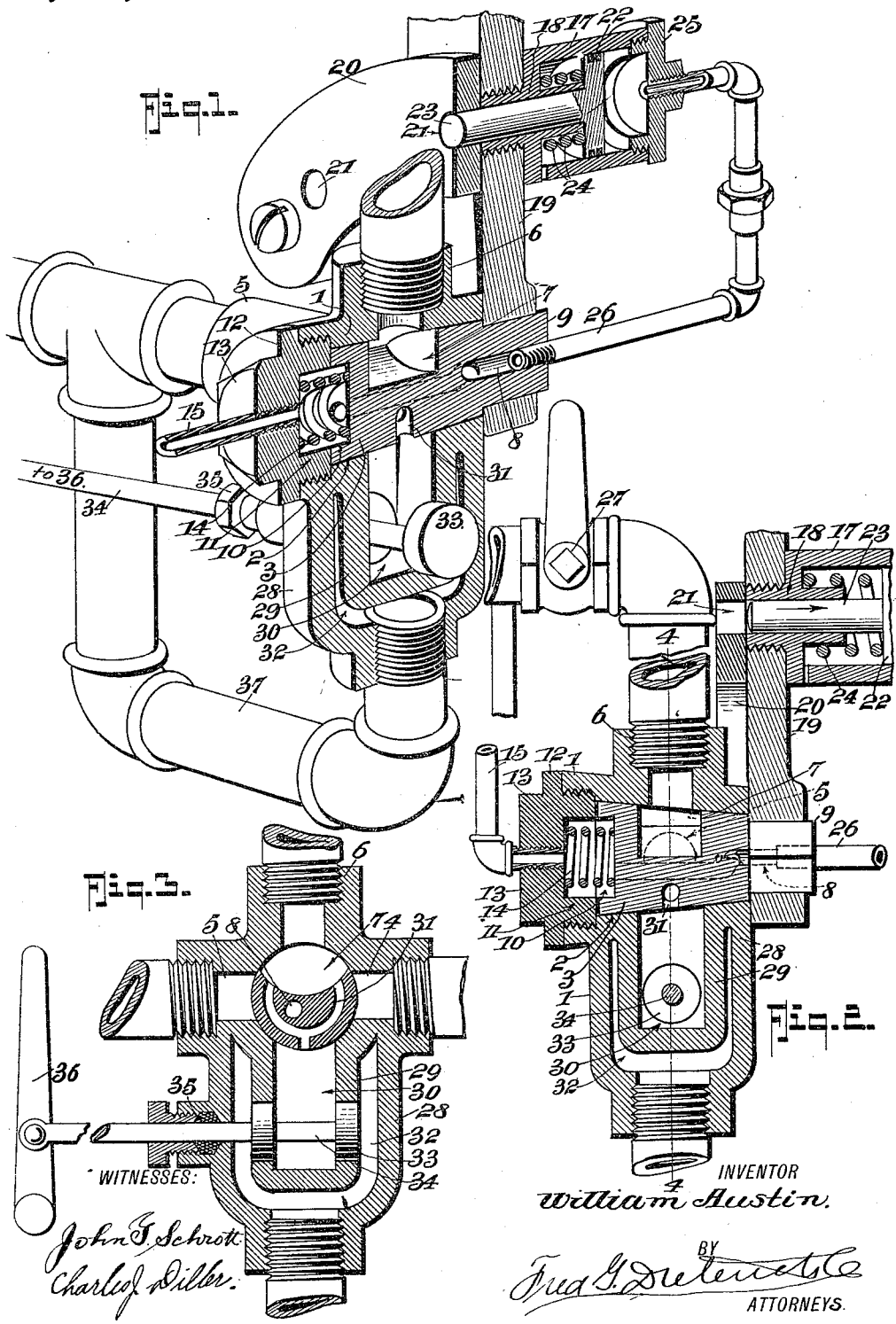

WILLIAM AUSTIN, OF SCRANTON, PENNSYLVANIA, ASSIGNOR OF ONE-HALF TO MICHAEL W. O'BOYLE, OF PITTSTON, PENNSYLVANIA.

VALVE MECHANISM FOR AIR-BRAKE SYSTEMS.

1,137,179.

Specification of Letters Patent. Patented Apr. 27, 1915.

Application filed March 30, 1914. Serial No. 828,280.

*To all whom it may concern:*

Be it known that I, WILLIAM AUSTIN, residing at Scranton, in the county of Lackawanna and State of Pennsylvania, have invented certain new and useful Improvements in Valve Mechanism for Air-Brake Systems, of which the following is a specification.

My invention relates to certain new and useful improvements in air brake valves and locking means therefor, the mechanism forming the subject-matter of my present application being specifically designed for use in connection with the train stopping system which forms the subject-matter of my application for Letters Patent filed March 10, 1914, Serial No. 823,714, although I do not desire it to be understood that the present valve mechanism is limited to use in connection with that system.

In its generic nature, the invention provides a valve, preferably of the plug type, the stem of which carries an air operated latch or detent to coöperate with the locking quadrant and secure the valve lever against displacement during the time air, under pressure, is passing through the valve, whereby to prevent the valve from being shifted during the time the air is passing through the same.

Another object of my invention is to provide means whereby should the engineer fail to set the main valve to permit passage of the train pipe air upon opening the automatic or trip valve, the connection with the train pipe air will be automatically made whenever the engineer moves the lever of the engineer's valve of the air brake system from its "lap" or neutral position.

Again, the invention resides in providing a valve mechanism in which the parts are so constructed as to be inexpensive to manufacture, strong, durable and not likely to be injured in service.

More subordinately, the invention includes those novel details of construction, combination and arrangement of parts, all of which will be first fully described, then be specifically pointed out in detail, reference being had to the accompanying drawings, in which:

Figure 1 is a sectional perspective view showing my invention, and showing the detent in the latching position. Fig. 2 is a sectional view showing the detent in its retracted position. Fig. 3 is a cross section on the line 4—4 of Fig. 2.

Referring now to the accompanying drawings, in which like letters and numerals of reference indicate like parts in all of the figures, 1 represents the valve casing which is bored at 2, to receive the valve proper 3. The casing 1, in the construction illustrated, is provided with two entrant passages 4—5, a single discharge or outlet passage 6, the entrant passages being adapted for connection with the train pipe of an air brake system and the outlet passage 6 being adapted for connection with the control valve which, when opened, permits the escape of air to said brake.

The valve proper 3 has a peripheral groove 7 for effecting communication between the discharge passage 6 and either of the entrant passages 4—5, the said groove being so designed, however, that when the valve lever 19 is in its vertical or mid-position communication between any of the passages 4—5 is cut off.

8 is a bore which extends through the valve proper 3 and through the squared lever end 9, the bore being designed for effecting communication between the spring pocket 10 and the pipe 26 for a purpose later explained.

The valve opening of the casing 1 is adapted to be closed by a screw plug 11 adapted to be seated against the casing having a flange 12 to seat against the casing 1 and a nut portion 13, by means of which the plug can be turned. The plug 11 is counterbored to form a continuation of the spring pocket 10 and acts as the spring pocket for retaining the spring 14, which functions to hold the valve proper 3 seated air-tight.

15 is an air pipe of a smaller diameter than the discharge 6, and the pipe 15 is adapted to be connected with the discharge at a place beyond the trip valve 27 so that when the trip valve 27 is opened a portion of the escaping air will pass through the pipe 15 into the spring pocket 10 from whence it flows through the bore 8 into the pipe 26.

17 is the air cylinder of the locking or latching detent 23, which detent is mounted for longitudinal movement in the bearing 18 of the cylinder 17, the said bearing being tapped into the lever 19 and there is provided a suitably packed piston 22 within the cylinder 17, and the piston 22 is adapted to be pressed in one direction by a spring 24, and in the other direction by the air which enters the cylinder from the pipe 26 through the plug cap 25.

20 is the quadrant which is provided with detent receiving holes 21, corresponding to the open positions of adjustment of the valve lever 19.

In operation, when the control valve 27 is opened to bleed the train pipe pressure and thereby set the brakes a portion of the escaping air passing through the pipe 15, bore 8 and pipe 10, will enter the cylinder 17 and impel the piston 22 to effect the locking function, thereby projecting the detent 23 into the opposite hole 21 of the quandrant during the time the air pressure is above atmosphere, the latching function being automatically released upon a flow in the pressure to a pressure less than the force of the spring 24. The purpose of this is to prevent the valve 3 from being moved to cut off the escaping air and unauthorizedly prevent the setting of the brakes.

The valve casing 1 is provided with a supplemental casing 28 in which is a nipple-like member 29 that has a chamber 30 in communication with the bore 2, but cut off from the ducts 4—5—6, by the valve proper 3 except when the lever 19 is in the vertical position. At that time, there is a communication between the chamber 30 and the duct 6 through the medium of the auxiliary passages 31 in the valve proper. The chamber 30 is normally cut out of communication with the chamber 32 by piston valves 33 that are mounted on a rod 34 which passes through a gland 35 and connects with the engineer's brake valve lever 36 so that when the engineer puts his brake valve on "lap" to operatively disconnect the air brakes of the engine, as in the case when the engine is acting as the second engine of the double header, there will be no communication between the chamber 30 and the chamber 32 and should the engineer forget to set the lever 19 over when he cuts loose from the train, the communication between the train pipe air and the duct 6 will be had as soon as he moves his brake valve out of "lap" position into the usual running positions. This communication is effected from the train line by air through the auxiliary duct 37, as best indicated in Fig. 1 of the drawings.

My invention is normally adapted for use in connection with the system hereinbefore referred to, yet it is of more or less general application and I do not desire to be understood as being limited in the use of the invention to a train stopping system of the character disclosed in my co-pending application referred to.

From the foregoing description, taken in connection with the accompanying drawing, it is thought the complete construction operation and advantages of my invention will be readily understood by those skilled in the art to which it appertains.

What I claim is:

1. A main control valve, a plurality of inlet ducts leading into said valve, an outlet duct leading from said valve, said valve adapted to bring either of said inlet ducts into communication with said outlet duct, according to the position of said valve, a valve moving lever, a quadrant, and fluid pressure operated means mounted on said lever for locking said lever and quadrant together during the time a fluid under pressure is passing through said valve.

2. A main control valve, a plurality of inlet ducts leading into said valve, an outlet duct leading from said valve, said valve adapted to bring either of said inlet ducts into communication with said outlet duct, according to the position of said valve, a valve moving lever, a quadrant, means for locking said lever and quadrant together during the time a fluid under pressure is passing through said valve, said means including a cylinder and piston-detent carried by said lever and adapted to engage said quadrant, and a duct for conveying a portion of the fluid which passes through the valve into said cylinder against said piston to bring said detent into locking engagement with said quadrant.

3. A main control valve, a plurality of inlet ducts leading into said valve, an outlet duct leading from said valve, said valve adapted to bring either of said inlet ducts into communication with said outlet duct, according to the position of said valve, a valve moving lever, a quadrant, means for locking said lever and quadrant together during the time a fluid under pressure is passing through said valve, said means including a cylinder and piston-detent carried by said lever and adapted to engage said quadrant, a duct for conveying a portion of the fluid which passes through the valve into said cylinder against said piston to bring said detent into locking engagement with said quadrant, and means for moving said piston to release said detent from said quadrant when the fluid pressure reaches a predetermined minimum.

4. A valve mechanism comprising a valve casing, a valve proper in the casing, fluid admission and outlet ducts for said casing, said valve proper adapted to control communication between the outlet and admission ducts according to the position of said valve proper, a chamber in said casing adjacent to the end of said valve proper, a fluid inlet duct communicating with said chamber, said valve proper having a fluid passage from said chamber to the outside of the valve proper, a valve moving lever, a piston mounted in said lever, a duct connecting said piston and the fluid passage of said valve proper, a detent-piston in said cylinder adapted to be moved in one direction by fluid pressure, means for moving said piston in the opposite direction when said fluid pressure is released, a quadrant, said quadrant having detent holes according to the positions of said lever, substantially as shown and described.

5. A valve mechanism comprising a valve casing, a valve proper in the casing, fluid admission and outlet ducts for said casing, said valve proper adapted to control communication between the outlet and admission ducts according to the position of said valve proper, a chamber in said casing adjacent to the end of said valve proper, a fluid inlet duct communicating with said chamber, said valve proper having a fluid passage from said chamber to the outside of the valve proper, a valve moving lever, a cylinder mounted on said lever, a duct connecting said cylinder and the fluid passage of said valve proper, a detent-piston in said cylinder adapted to be moved in one direction by fluid pressure, means for moving said piston in the opposite direction when said fluid pressure is released, a quadrant, said quadrant having detent holes according to the positions of said lever, and connections between said outlet of said valve casing and said casing chamber for conveying a portion of the discharge fluid to said chamber to thereby pass to said cylinder and operate said detent-piston.

6. A valve mechanism of the class described comprising a valve casing having inlet and outlet passages, a valve proper controlling communication between the several passages, a valve operating lever and quadrant, and a fluid operated latch for securing said lever and quadrant together at times, said latch comprising a cylinder mounted on said lever, a piston mounted in said cylinder and having a detent, a fixed quadrant having apertures to be engaged by said detent and a fluid conveying pipe connection between said valve and said cylinder.

7. A valve mechanism of the class described comprising a valve casing having inlet and outlet passages, a valve proper controlling communication between the several passages, a valve operating lever and quadrant, a fluid operated latch for securing said lever and quadrant together at times, said casing including a supplemental valve chamber, an inlet duct in communication with said supplemental chamber, a valve passageway between said supplemental chamber and said valve proper, said valve proper having a supplemental fluid passage for conveying fluid from said supplemental chamber to said first mentioned outlet passage when said valve proper is in its cut off position, and an auxiliary valve in said supplemental valve passage normally closing the same and adapted to be moved to open said supplemental passage.

8. In a valve mechanism for air brake systems and the like, a valve casing having a main valve chamber, a plurality of inlet ducts leading to said chamber and an outlet duct leading from said chamber, a main valve proper controlling the passage between said ducts, said main valve proper adapted to close off communication between said outlet duct and the other ducts when said valve is in a cutoff position, said valve casing including a supplemental valve chamber, a duct leading into said supplemental valve chamber, a duct effecting communication between said supplemental valve chamber and said main valve chamber, said main valve proper adapted to close said supplemental duct when said main valve is in either of its open positions, said main valve proper having a supplemental fluid passage to effect communication between said supplemental valve chamber and said main outlet duct when said main valve proper is in the cutoff position, and a supplemental valve for controlling the passage of fluid from said supplemental valve chamber inlet to said supplemental duct to said main valve chamber.

9. In a valve mechanism for air brake systems and the like, a valve casing having a main valve chamber, a plurality of inlet ducts leading to said chamber and an outlet duct leading from said chamber, a main valve proper controlling the passage between said ducts, said main valve proper adapted to close off communication between said outlet duct and the other ducts when said valve is in a cutoff position, said valve casing including a supplemental valve chamber, a duct leading into said supplemental valve chamber, a duct effecting communication between said supplemental valve chamber and said main valve chamber, said main valve proper adapted to close said supplemental duct when said main valve is in either of its open positions, said main valve proper having a supplemental fluid passage to effect communication between said supplemental valve chamber and said main outlet duct when said main valve proper is in the cutoff position, a supplemental valve for controlling the passage of fluid from said supplemental valve chamber inlet to said supplemental duct to said main valve chamber, a valve operating lever and quadrant for said main valve proper, and a fluid operated latch for securing said lever and quadrant together when said lever is in any of its predetermined positions.

WILLIAM AUSTIN.

Witnesses:
JAMES F. O'BOYLE,
THOS. V. FLANAGAN.

Copies of this patent may be obtained for five cents each, by addressing the "Commissioner of Patents, Washington, D. C."